S. HALL.
Cultivator.
No. 50,930. Patented Nov 14, 1865.
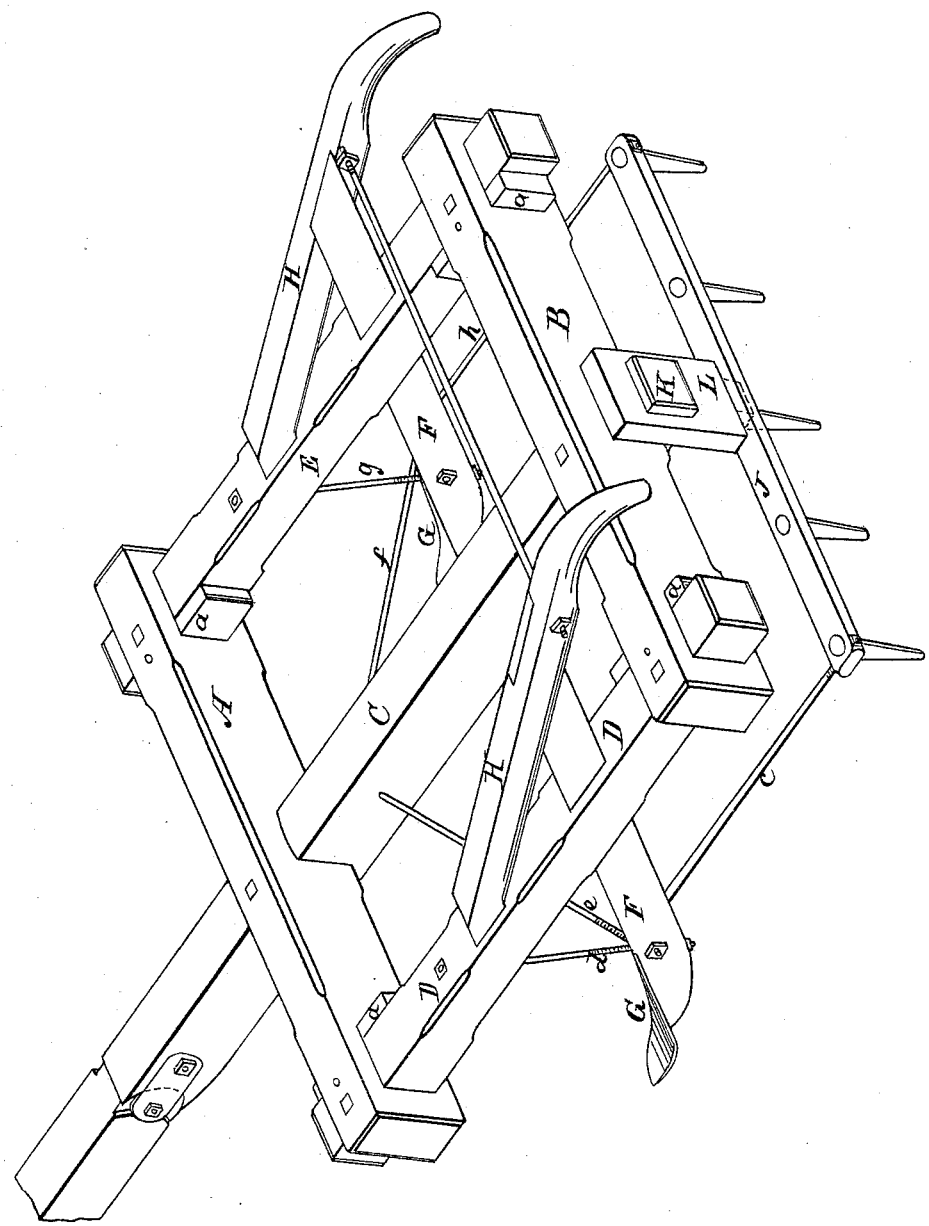
Witnesses:
Th. Lang.
Geo R Adams.
Inventor:
Stanley Hall
by his Attys
Baldwin &Son

United States Patent Office.

STARKEY HALL, OF RUSSELLVILLE, KENTUCKY.

IMPROVEMENT IN CULTIVATORS.

Specification forming part of Letters Patent No. 50,930, dated November 14, 1865.

*To all whom it may concern:*

Be it known that I, STARKEY HALL, of Russellville, in the county of Logan and State of Kentucky, have invented a new and useful Improvement in Cultivators; and I do hereby declare that the following is a full, clear, and exact description of the construction and operation of the same, reference being had to the accompanying drawing, making a part of this specification, and constituting a perspective view of my cultivator.

My invention consists in the combination of plows adjustable to any width of furrow or ridge with an adjustable harrow rigidly attached, so that as the plows throw the earth to or from the growing crop the harrow will break the clods and pulverize them.

In constructing my invention I form a frame of suitable strength of a rectangular form, with cross-bars A and B in front and rear, resting centrally upon the rigid tongue or stock C, to which the bars are fastened securely in any proper manner. The ends of the bars A and B are mortised to receive side bars, D and E, the position of which bars can be adjusted to suit varying widths of culture by wedges $a$, which serve to securely fasten the bars in position; or bolts may be added, if necessary, to keep the side bars rigid in the frame, and, of course, when the cross-bars are to be adjusted the bolts must first be withdrawn, and when the adjustment is complete the bolts can be replaced and securely fastened by screw-nuts.

The side bars, D and E, receive the stocks F, to which the plows G are fastened; and the handles H of the plows are fastened to the cross-pieces and plow-beams, as shown in the drawing, or in any other suitable manner.

The harrow J is made rigid, and is rigidly attached to the projection K of the rear end of the tongue or stock C by a mortised block, L, fitted on and fastened firmly to the rear projecting end of the tongue. The center tooth of the harrow may project from the center of the block L, and the harrow may be adjusted upon the rear projection of the tongue a greater or less distance from the plows, as the condition of the ground may require. In adjusting both the plows and the harrow the stay-rods $c$, $d$, $e$, $f$, $g$, and $h$ must be lengthened or shortened to accommodate the adjustment desired, and this may be easily effected by making these rods with screws and nuts to fasten them in place.

In operation my cultivator can be adjusted to plowing in furrows or on the sides of ridges of varying distances apart, and the harrow will pulverize any clods the plows may turn up; and by bearing hard upon the handles the harrow will serve as a fulcrum to lift the plows out of the ground for lighter work than they may be set to perform, while by raising the handles the plows can be run deeper and the harrow made only to scratch the surface, and these capabilities of my invention give varied utility to my combination.

What I claim by my invention, and desire to secure by Letters Patent, is—

The combination, in a cultivator, of laterally-adjustable plows with a longitudinally-adjustable harrow having a rigid attachment to the rear of the frame, when constructed, arranged, and operating substantially in the manner and for the purpose set forth.

In testimony whereof I have hereunto subscribed my name.

STARKEY HALL.

Witnesses:
V. S. McCURDY,
GEO. O. VICK,
J. B. ELLIS.